US010989091B2

(12) United States Patent
Pabst et al.

(10) Patent No.: US 10,989,091 B2
(45) Date of Patent: Apr. 27, 2021

(54) CATALYTIC CONVERTER WITH ELECTRICALLY HEATABLE HEATING PLATE

(71) Applicant: CPT Group GMBH, Hannover (DE)

(72) Inventors: Christoph Pabst, Melle (DE); Peter Hirth, Rösrath (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/556,481

(22) Filed: Aug. 30, 2019

(65) Prior Publication Data

US 2019/0383193 A1    Dec. 19, 2019

Related U.S. Application Data

(63) Continuation of application No. PCT/EP2018/054506, filed on Feb. 23, 2018.

(30) Foreign Application Priority Data

Mar. 3, 2017   (DE) .................. 10 2017 203 546

(51) Int. Cl.
    *F01N 3/28*     (2006.01)
    *F01N 3/20*     (2006.01)
(52) U.S. Cl.
    CPC ........... *F01N 3/281* (2013.01); *F01N 3/2026* (2013.01); *F01N 2330/04* (2013.01); *F01N 2330/32* (2013.01)
(58) Field of Classification Search
    None
    See application file for complete search history.

(56) References Cited

U.S. PATENT DOCUMENTS

| 5,146,743 A |   | 9/1992 | Maus et al. |
| 5,322,672 A | * | 6/1994 | Breuer ................ B01J 35/04 422/180 |
| 5,382,774 A |   | 1/1995 | Bruck et al. |
| 5,405,422 A | * | 4/1995 | Ueda ................. B01D 46/0063 422/174 |

(Continued)

FOREIGN PATENT DOCUMENTS

| CN | 1806469 A | 7/2006 |
| CN | 104053876 A | 9/2014 |

(Continued)

OTHER PUBLICATIONS

International Search Report and Written Opinion dated May 14, 2018 from corresponding International Patent Application No. PCT/EP2018/054506.

(Continued)

*Primary Examiner* — Jelitza M Perez

(57) ABSTRACT

A catalytic converter having a honeycomb structure for the aftertreatment of exhaust gases of an internal combustion engine and having an electrically heatable heating plate, wherein the heating plate is formed from a plurality of metal foils which are stacked on top of one another to form a layer stack and are finally wound to form a honeycomb structure having a plurality of flow ducts, wherein the heating plate has arranged therein an insulating means via which electrical insulation is formed between at least two mutually adjacently arranged wound metal foils.

13 Claims, 3 Drawing Sheets

(56) References Cited

U.S. PATENT DOCUMENTS

| | | | | |
|---|---|---|---|---|
| 5,411,711 A | * | 5/1995 | Swars | B01J 35/0033 |
| | | | | 422/177 |
| 5,422,082 A | * | 6/1995 | Yoshizaki | B01D 53/9454 |
| | | | | 422/174 |
| 9,393,521 B2 | | 7/2016 | Brueck et al. | |
| 2010/0184590 A1 | * | 7/2010 | Althofer | B23K 1/0014 |
| | | | | 502/185 |
| 2013/0095003 A1 | * | 4/2013 | Lutz | B01J 23/75 |
| | | | | 422/180 |

FOREIGN PATENT DOCUMENTS

| | | |
|---|---|---|
| DE | 2255087 A1 | 5/1973 |
| DE | 19943846 A1 | 3/2001 |
| DE | 102012000496 A1 | 7/2013 |
| EP | 0412103 A1 | 2/1991 |
| EP | 0541190 A1 | 5/1993 |
| JP | H06246174 A | 9/1994 |
| JP | H07502582 A | 3/1995 |
| JP | H0947864 A | 2/1997 |
| JP | H03500911 | 9/1999 |
| JP | H11253815 A | 9/1999 |
| WO | 8910470 A1 | 11/1989 |
| WO | 8910471 A1 | 11/1989 |
| WO | 9913269 A1 | 3/1999 |

OTHER PUBLICATIONS

German Office Action dated Jan. 15, 2018 for corresponding German Patent Application No. 10 2017 203 546.3.

* cited by examiner

CATALYTIC CONVERTER WITH ELECTRICALLY HEATABLE HEATING PLATE

CROSS-REFERENCE TO RELATED APPLICATIONS

This application claims the benefit of PCT Application PCT/EP2018/054506, filed Feb. 23, 2018, which claims priority to German Patent Application 10 2017 203 546.3, filed Mar. 3, 2017. The disclosures of the above applications are incorporated herein by reference.

FIELD OF THE INVENTION

The invention relates to a catalytic converter having a honeycomb structure for the aftertreatment of exhaust gases of an internal combustion engine and having an electrically heatable heating plate, wherein the heating plate is formed from a plurality of metal foils which are stacked on top of one another to form a layer stack and are finally wound to form a honeycomb structure having a plurality of flow ducts.

BACKGROUND OF THE INVENTION

In addition to a plurality of different catalytic converters, exhaust-gas systems of internal combustion engines are also known to have heating elements which are used for the targeted heating of the exhaust-gas flow. This is necessary for example in order, after the cold start of the internal combustion engine, to increase the exhaust-gas temperature more quickly to a temperature level which is necessary to be able to effectively begin the aftertreatment of the exhaust gas.

Heating elements are known in a wide variety, particularly in the form of heating plates which are formed from wound layer stacks composed of structured and unstructured metal foils. The heating plates are heated using ohmic resistance by a current being conducted through the heating plate.

In order to generate a directed current flow within the heating plate, it is necessary for the wound metallic layers to be electrically insulated from one another. Suitable measures have to be taken for this purpose. Devices are known in which a spacer is inserted between the metallic layers before the metallic layers are wound. The spacer is removed again subsequent to the winding operation, resulting in an air gap which spaces apart the metallic layers and creates electrical insulation.

A disadvantage with these devices is particularly the fact that an additional work step is necessary to remove the spacer. Furthermore, damage occurs to the actual heating plate upon removal of the spacer. In addition, there is a reduction in the active surface of the heating plate for the heating and for the catalytic conversion of the exhaust gas if the heating plate has a corresponding chemical coating.

The use of spacers and insulating means which fill the customarily air-filled gap between the windings of the metallic layers is disadvantageous since the flow of the exhaust gas through the heating plate and the catalytic converters arranged downstream is negatively influenced as a result. Furthermore, it is difficult for an alternative spacer or an alternative insulating material to be left in the heating plate since, on account of the high temperature dynamics and the strong mechanical loads in the exhaust-gas system, this is associated with a very high outlay and the risk of a defect is greatly increased.

SUMMARY OF THE INVENTION

The problem addressed by the present invention is therefore to provide a catalytic converter having a heating element designed as a heating plate, which catalytic converter has an optimized design and in particular has improved insulation of the metallic layers in the heating plate from one another in order that a targeted current flow is realized.

The problem in terms of the catalytic converter is solved by a catalytic converter having the features as described.

One exemplary embodiment of the invention relates to a catalytic converter having a honeycomb structure for the aftertreatment of exhaust gases of an internal combustion engine and having an electrically heatable heating plate, wherein the heating plate is formed from a plurality of metal foils which are stacked on top of one another to form a layer stack and are finally wound to form a honeycomb structure having a plurality of flow ducts, wherein the heating plate has arranged therein an insulating means via which electrical insulation is formed between at least two mutually adjacently arranged wound metal foils.

The insulating means serves the purpose of electrically insulating from one another the mutually adjacently situated metallic layers which come into contact with one another as a result of winding the layer stack. This is necessary in order to generate a defined current path, in order to achieve uniform heating and furthermore in order to be able to precisely determine the resistivity of the heating plate. If the entire honeycomb structure generated by the winding operation were a completely electrically conducting interconnected region, the current conduction through the honeycomb structure would occur arbitrarily and randomly as it were, and therefore the respective ohmic resistance of the current path in the heating plate could practically not be determined beforehand, with the result that the determination of the temperature to be achieved at a defined current intensity would not be possible either. It is therefore necessary, through the skilful introduction of an insulating means, to generate an exactly definable current path into which an electric current of known current intensity is introduced in a defined manner in order to generate predeterminable heating at an ohmic resistance defined by the known current path.

It is particularly advantageous here if the entire volume occupied by the heating plate may also be used for the catalytic treatment of the exhaust gas and if the surface of the heating plate with respect to the volume occupied overall is as large as possible. The pressure loss generated by the heating plate should be as low as possible, for which reason it is particularly advantageous if the heating plate has as few elements as possible which could prevent the exhaust gas from flowing through.

It should be pointed out at this juncture that the terms metallic layer and metal foil are used as synonyms and the same elements are described using different terms.

The insulating means in question is therefore preferably constituted by coatings on the metal foils used in the layer stack.

It is particularly advantageous if the insulating means is formed by a metal foil coated with an insulating layer. Particularly advantageous layers are ones which are applied for example by chemical or physical processes and which, on the one hand, bring about electrical insulation but, on the other hand, do not negatively influence the basic properties of the material of the metal foils. In particular, the heat sensitivity of the metal foils should not be increased. Nor should the flexibility of the metal foils, which is required for example for the winding operation, be adversely affected.

Moreover, the electrically insulating coatings are advantageously configured in such a way that they are durable and such that no damage occurs to the insulating layer even under highly dynamic thermal and mechanical loads.

It is also advantageous if the layer stack is formed from a plurality of structured metal foils and a plurality of smooth metal foils which are stacked on top of one another in alternating fashion, wherein the uppermost edge layer and the lowermost edge layer of the layer stack have an insulating layer on their surfaces facing away from the center of the layer stack.

In particular, the coating of the outer surfaces of the edge layers that face away from the layer stack is advantageous, since this is brought into direct contact with the other layers of the layer stack during the winding operation. The electrically insulating coating of the edge layers thus generates a current path which has a radial thickness in the wound state that corresponds to the height of the layer stack in the unwound state. It is possible in this way to generate a very exactly definable current path which is defined by the height and the depth of the layer stack. As a result, a heating plate which has a defined current path and a precisely determinable ohmic resistance is generated in a particularly simple manner.

A preferred exemplary embodiment is characterized in that the uppermost edge layer and the lowermost edge layer of the layer stack are formed by a smooth metal foil. This is particularly advantageous for the winding of the layer stack in order to prevent corrugated edge layers from jamming in one another and to make it possible that the layers coming into contact with one another as a result of the winding operation allow a relative movement with respect to one another in the circumferential direction. This makes possible a particularly tight winding of the heating plate.

It is also to be preferred if the metal foils coated with the insulating layer have, on the insulating layer, an adhesion promoter and a solder layer for soldering the metal foils.

The solder is advantageous in order also to be able to interconnect the wound layers. Soldering methods are preferably used for this purpose since they may simultaneously generate an integrally bonded connection at many contact points.

An adhesion promoter is for example a chemical agent which fixes the solder to the insulating layer. It is also possible for example for metallic layers to be applied to the insulating layer in order to form an adhesion base for a ceramic material.

It is also expedient if the insulating layer is applied to the metal foil by means of aerosol deposition and/or flame spraying. In such a configuration, the adhesion promoter is explicitly dispensed with since the insulating layer is applied directly to the metal foil.

Moreover, it is advantageous if the layer stack is wound about at least one central rotation point, wherein a spiral current path delimited in the radial direction by the two insulating layers on the edge layers is formed.

Furthermore, it is advantageous if, in addition to the uppermost edge layer and the lowermost edge layer of the layer stack, at least one further intermediate layer of the layer stack has an insulating layer at least on one side. This is advantageous since the current path may also be further subdivided in this way. Depending on the configuration of the insulating intermediate layer, current paths which are completely separated from one another, or for example only partially separated current paths, may thus be generated within the layer stack.

It is also expedient if the current path is partially subdivided into at least two mutually separated current paths by the insulating intermediate layer. This is particularly advantageous in order for example to be able to better guide the current flow in critical regions. This particularly makes it possible to avoid hotspots which may arise as a result of excessive heating on account of a locally high current flow. Since the current seeks the path of least resistance, such hotspots may occur particularly at kink points and tight bends in the region of the inner smaller bend radii, since the current does not flow uniformly over the whole width of the current path, but a greater current flow occurs in the region of the tighter bending radii.

The current flow is influenced in a targeted manner by an insulating intermediate layer, with the result that such a nonuniform distribution may be avoided or at least significantly reduced. This is advantageous in order to achieve more homogeneous heating of the heating plate.

Moreover, it is advantageous if the insulating intermediate layer itself or the insulating layer on the intermediate layer has a shorter extent than the insulating layer on the outer upper edge layer and the outer lower edge layer. This is particularly advantageous in order indeed to generate a current path supplied with current via an introduction point, but, for the purpose of influencing the actual current flow, to be able to correspondingly configure the current path. As already described above, the current flow within the main current path may thus be partially better guided so as for example to generate more uniform heating.

Furthermore, it is expedient if the insulating means is formed by a material which is provided with an adhesion promoter and which is applied to one or more of the metal foils and wound with the metal foils. This is for example a thin ceramic or else only a ceramic coating. The insulating means is advantageously approximately as thin as the remaining metal foils in order to keep the installation space occupied by the insulating means as small as possible. The insulating means also has a similar flexibility to the metal foils so as not to be damaged during the winding operation.

It is additionally advantageous if the material provided with the adhesion promoter is formed by a green ceramic.

Advantageous developments of the present invention are described in the dependent claims and in the following description of the figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail in the following text on the basis of exemplary embodiments with reference to the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
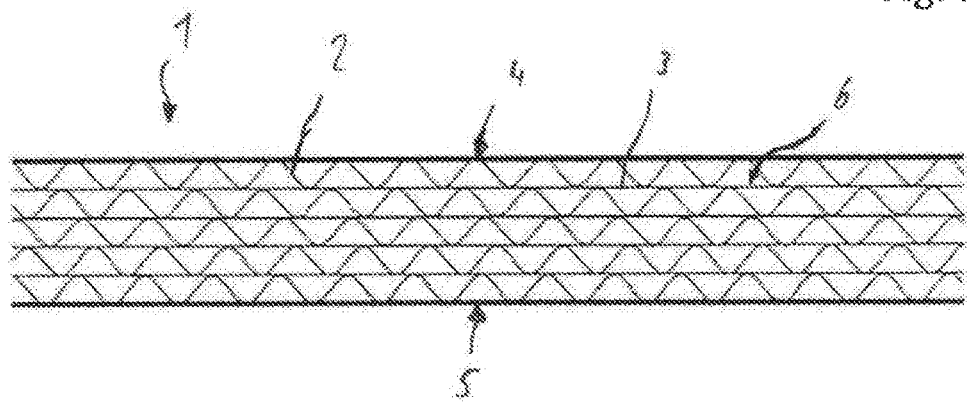
FIG. 1 shows a sectional view through a layer stack having a plurality of corrugated layers and a plurality of smooth layers, wherein the edge layers of the layer stack have an insulating layer on their outer surfaces.

FIG. 1 shows a sectional view through a layer stack 1. The layer stack 1 is formed from a plurality of corrugated metal foils 2 and a plurality of smooth metal foils 3 which are stacked on top of one another in alternating fashion. A plurality of flow ducts 6 through which exhaust gas may flow are formed between the metal foils 2, 3. The metal foils 2, 3 shown in FIG. 1 are by way of example and do not limit the choice of the metal foils.

The upper edge layer 4 and the lower edge layer 5 are both formed by smooth metal foils 3. On their respective outer sides, they have an insulating layer which electrically insulates the layer stack to the top and bottom. For this purpose, an electrically insulating material is applied for example to the edge layers 4, 5.

Figure 2:
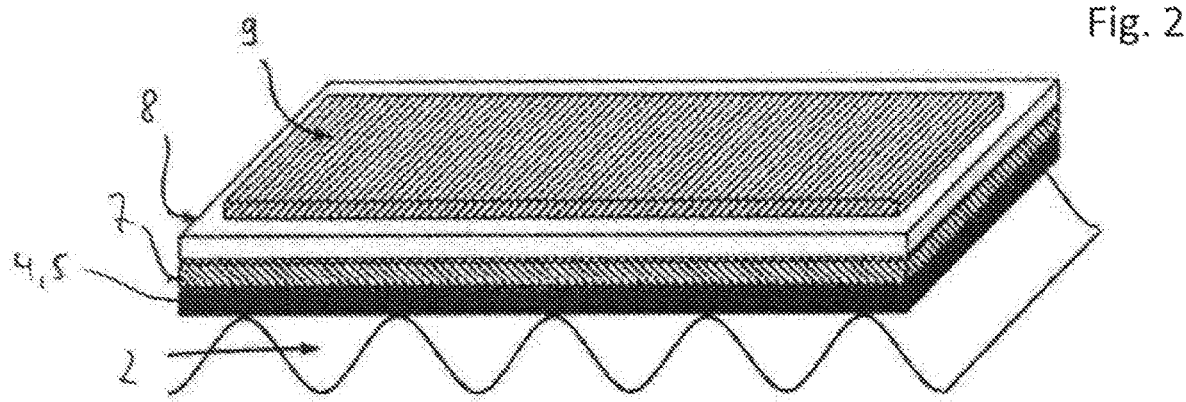
FIG. 2 shows a perspective view of a layer stack having an edge layer with an electrically insulating coating.

FIG. 2 shows a detail view of one of the edge layers 4, 5. There may be seen the smooth metal foil 3 and the corrugated metal foil 2 arranged below it. An insulating layer 7 is applied to the edge layer 4, 5. Additionally shown in FIG. 2 is an adhesion promoter 8 which is used for example to bind the solder material 9 to the insulating layer 7. This multi-layered construction thus, firstly, ensures the electrical insulation of the layer stack and furthermore allows the soldering of the subsequently wound layer stack to form a honeycomb structure.

Figure 3:
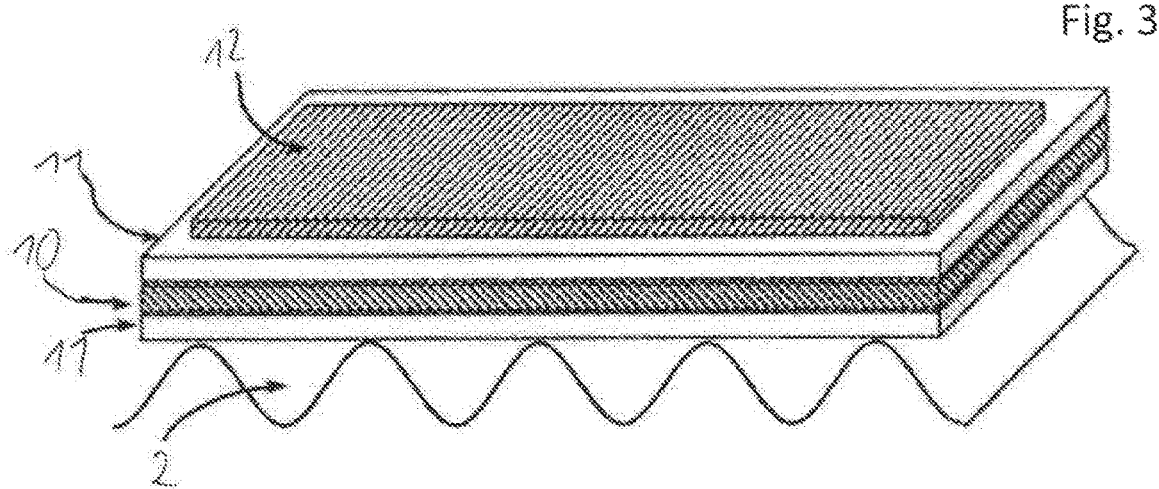
FIG. 3 shows a perspective view of a layer stack having an edge layer with an electrically insulating coating.

FIG. 3 shows a detail view of an alternative layer stack. An insulating layer 10 is applied to the corrugated metal foil 2 and has an adhesion promoter 11 both on its upwardly directed surface and on its downwardly directed surface. The downwardly directed adhesion promoter 11 serves for attaching the insulating layer 10 to the corrugated metal foil 2. The upwardly directed adhesion promoter 11 serves for attaching the solder material 12.

The insulating layer 10 is formed for example by a ceramic material.

Figure 4:
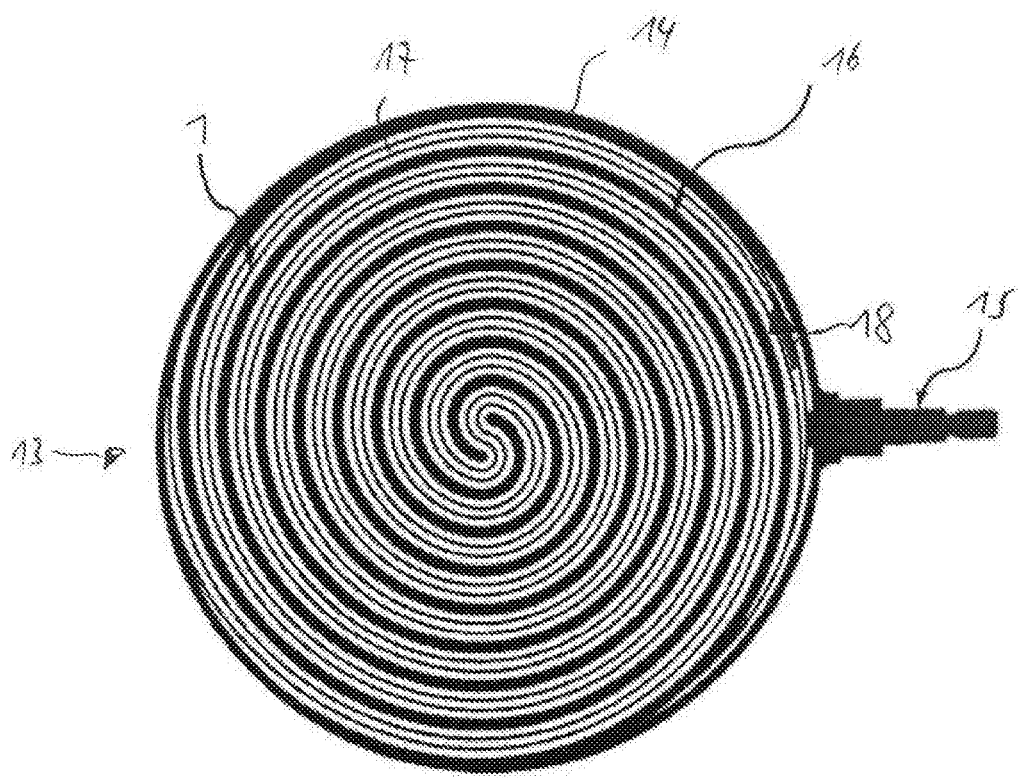
FIG. 4 shows a view of a heating plate which consists of a wound layer stack and is inserted into a housing which has an introduction point through which current is introduced into the current path of the heating plate.

FIG. 4 shows a view of a finished heating plate 13 which is formed from a wound layer stack 1. The wound layer stack 1 is inserted into a housing 14 and, by means of a soldering operation, the wound layer stack is fixed in the housing 14 and the individual layers are fixed relative to one another by the solder material applied to the edge layers.

Also illustrated is an introduction point 15 which penetrates through the housing 14 and generates an electrically conducting connection to the wound layer stack 1. A current is introduced into the layer stack via the introduction point.

The wound layer stack 1 has the corrugated and the smooth metal foils 17, which are bordered by the edge layers coated with an insulating layer 16. In this way there is generated a spirally extending current path 18 which is in each case delimited in the radial direction by the edge layers coated with the insulating layers 16.

Figure 5:
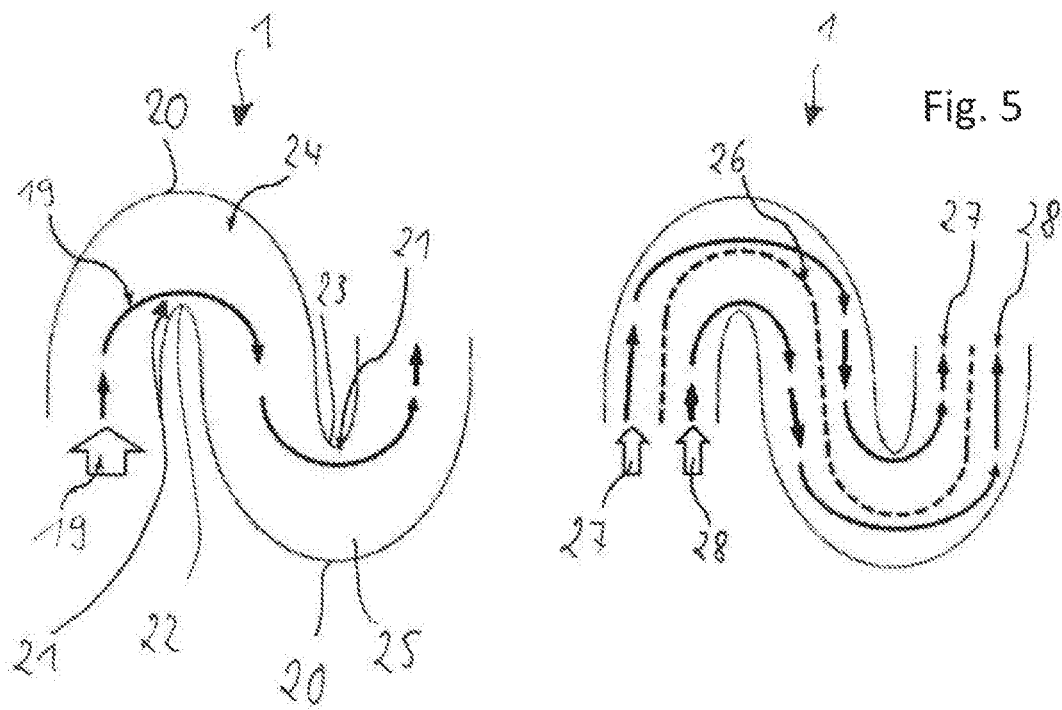
FIG. 5 shows a detail view of the heating plate, wherein in particular a region is shown in which the current path has pronounced bends or kinks as a result of the winding operation.

FIG. 5 shows a detail view of the wound layer stack 1 of FIG. 4. There is in particular shown the region in the center of the layer stack 1 about which the winding of the layer stack 1 occurred. Since, in the exemplary embodiment shown, the layer stack 1 has been wound about two winding mandrels, an s-shaped profile results for the layer stack 1 in the region about which the winding has taken place.

Illustrated in the left-hand part is a current path 19 which is delimited by the insulating layer on the edge layers 20. Since the current chooses the path of least resistance, the current will mainly flow over the shortest possible route through the current path 19. This has the effect, particularly in the region of the kinks 22, 23, that hotspots 21 are formed on the inner side of the kinks 22, 23, which hotspots, by virtue of an increased current flow, heat more strongly than the outer regions 24, 25 of the kinks 22, 23. This leads to a disadvantageous nonhomogeneous heat distribution in the heating plate and should therefore be avoided.

The right-hand part of FIG. 5 shows an exemplary embodiment in which, in addition to the insulating layers on the edge layers, a further insulating layer is formed on an intermediate layer 26 in the center of the wound layer stack. This additional insulating layer 26 subdivides the current path into two regions 27, 28, thereby ensuring that at least the current flowing in the region 27 which comprises the outer region of the left kink does not flow in the direct region of the tighter bending radius and thus heats the latter to an increased degree. The additional insulating layer 26 hereby forms as it were a guard rail for the current and thus creates better distribution of the current flow in the region of the kink points and particularly in the region of the tight bending radii on which the hotspots 21 have formed in the left-hand part of FIG. 5.

Figure 6:
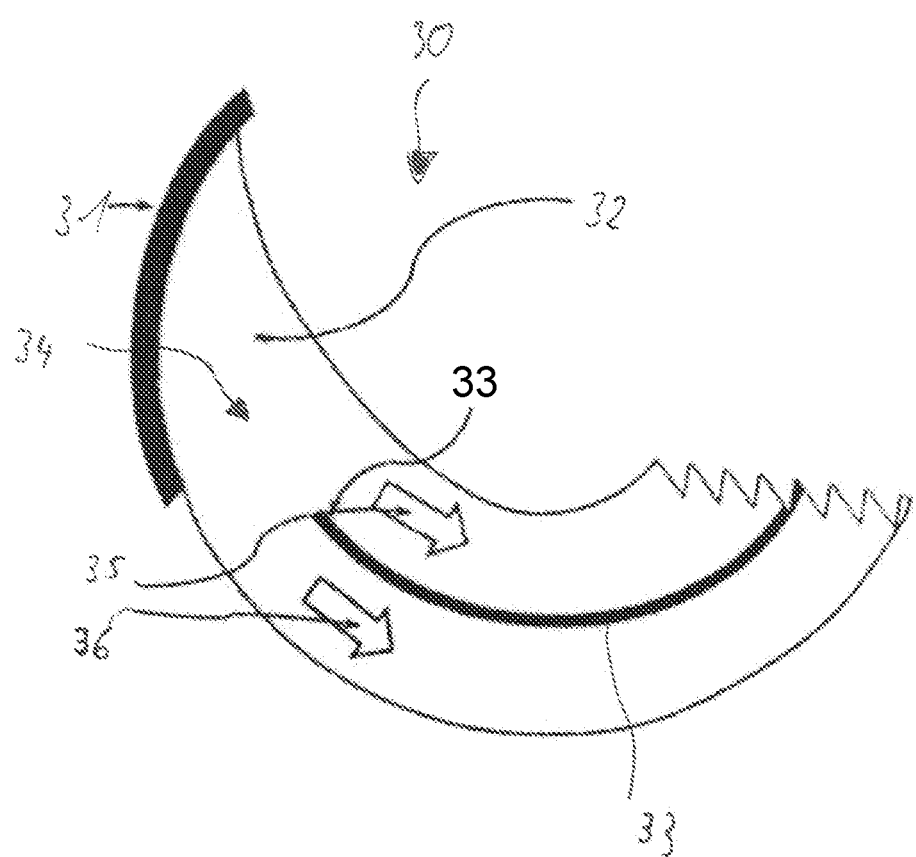
FIG. 6 shows a detail view of a layer stack which is wound to form a heating plate, wherein an electrically insulating intermediate layer is provided which at least partially subdivides the current path into a plurality of regions.

FIG. 6 shows a schematic view of a heating plate 30. The current is introduced into the wound layer stack 32 via a half-shell 31. The layer stack 32 has in its interior an insulating layer 33 which is arranged centrally between the corrugated layers and the smooth layers. The insulating layer 33 has a considerably shorter extent than the remainder of the layers used. This means that, in the region of the current introduction, no insulation is formed between the individual layers. It is only from the start of the insulating layer 33 that the current path 34 formed by the layer stack is subdivided into two subpaths 35, 36. The insulating layer 33 thus particularly generates a division of the current path 34 in the vicinity of the winding centers about which the layer stack has been wound.

In an alternative embodiment, it is also possible to provide a plurality of insulating layers which divide the current path even more finely. This is substantially dependent on how exactly the current path should be divided in order to obtain a distribution which is as homogeneous as possible.

The different features of the individual exemplary embodiments may also be combined with one another. The exemplary embodiments in FIGS. 1 to 6 are in particular not of a limiting nature and serve for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A catalytic converter, comprising:
a honeycomb structure for the aftertreatment of exhaust gases of an internal combustion engine;
a plurality of flow ducts, the plurality of flow ducts being part of the honeycomb structure;
an electrically heatable heating plate, and the heating plate is formed from a plurality of metal foils which are stacked on top of one another to form a layer stack and are wound to form the honeycomb structure having the plurality of flow ducts;
a plurality of insulating layers arranged as part of the heating plate, and an electrical insulation is formed through at least one of the plurality of insulating layers located between at least two of the plurality of metal foils;
a plurality of adhesion promoter layers, at least one of the plurality of insulating layers having one of the plurality of adhesion promoter layers on its upwardly directed surface and another of the plurality of adhesion promoter layers on its downwardly directed surface;
a portion of the plurality of metal foils further comprising a plurality of smooth metal foils;
a portion of the plurality of metal foils further comprising a plurality of structured metal foils, and the plurality of structured metal foils and the plurality of smooth metal foils are stacked on top of one another in alternating fashion to form the layer stack;
an uppermost edge layer, a first of the plurality of insulating layers being disposed on a surface of the uppermost edge layer facing away from a center of the layer stack;
a lowermost edge layer, a second of the plurality of insulating layers being disposed on a surface of the lowermost edge layer facing away from the center of the layer stack;
at least one central rotation point;
a spiral current path, and the layer stack is wound about the at least one central rotation point, and the spiral current path is delimited in the radial direction by the first of the plurality of insulating layers located on the uppermost edge layer and the second of the plurality of insulating layers located on the lowermost edge layer; and
at least one insulating intermediate layer being part of the layer stack, the at least one insulating intermediate layer located between the uppermost edge layer and the lowermost edge layer.

2. The catalytic converter of claim 1, wherein one of the plurality of metal foils is coated with one of the plurality of insulating layers.

3. The catalytic converter of claim 1, wherein the uppermost edge layer is a smooth metal foil, and the lowermost edge layer is a smooth metal foil.

4. The catalytic converter of claim 1, the layer stack further comprising:
wherein one of the plurality of insulating layers is disposed on one side of the at least one insulating intermediate layer.

5. The catalytic converter of claim 4, wherein the spiral current path is partially subdivided into at least two mutually separated current paths by the at least one insulating intermediate layer.

6. The catalytic converter of claim 4, wherein the one of the plurality of insulating layers on the at least one insulating intermediate layer is shorter than the one of the plurality of insulating layers disposed on the uppermost edge layer and the one of the plurality of insulating layers disposed on the lowermost edge layer.

7. The catalytic converter of claim 1, wherein the spiral current path is partially subdivided into at least two mutually separated current paths by the at least one insulating intermediate layer.

8. The catalytic converter of claim 1, wherein the at least one insulating intermediate layer is shorter than the one of the plurality of insulating layers disposed on the uppermost edge layer and the one of the plurality of insulating layers disposed on the lowermost edge layer.

9. The catalytic converter of claim 1, wherein at least one of the plurality of adhesion promoter layers is formed by a green ceramic.

10. The catalytic converter of claim 1, wherein one of the plurality of insulating layers is applied to a corresponding of the plurality of metal foils by aerosol deposition and flame spraying.

11. The catalytic converter of claim 1, wherein one of the plurality of insulating layers is applied to a corresponding of the plurality of metal foils by aerosol deposition.

12. The catalytic converter of claim 1, wherein one of the plurality of insulating layers is applied to a corresponding of the plurality of metal foils by flame spraying.

13. A catalytic converter, comprising:
a honeycomb structure for the aftertreatment of exhaust gases of an internal combustion engine;
a plurality of flow ducts, the plurality of flow ducts being part of the honeycomb structure;
an electrically heatable heating plate, and the heating plate is formed from a plurality of metal foils which are stacked on top of one another to form a layer stack and are wound to form the honeycomb structure having the plurality of flow ducts;
a plurality of insulating layers arranged as part of the heating plate, and an electrical insulation is formed through at least one of the plurality of insulating layers located between at least two of the plurality of metal foils;
a plurality of adhesion promoter layers, at least one of the plurality of insulating layers having one of the plurality of adhesion promoter layers on its upwardly directed surface and another of the plurality of adhesion promoter layers on its downwardly directed surface; and
a solder layer disposed on one of the plurality of adhesion promoter layers;
wherein the solder layer is used for soldering one or more of the plurality of metal foils.

* * * * *